March 7, 1967 P. A. HOMIER ET AL 3,307,990
METHOD OF MAKING A COMPOSITE PRODUCT
Filed Dec. 3, 1962 2 Sheets-Sheet 1

INVENTORS
PAUL A. HOMIER
RUPERT A. McDANIEL, Jr.
BY Cushman, Darby & Cushman
ATTORNEYS March 7, 1967 P. A. HOMIER ETAL 3,307,990
METHOD OF MAKING A COMPOSITE PRODUCT
Filed Dec. 3, 1962 2 Sheets-Sheet 2
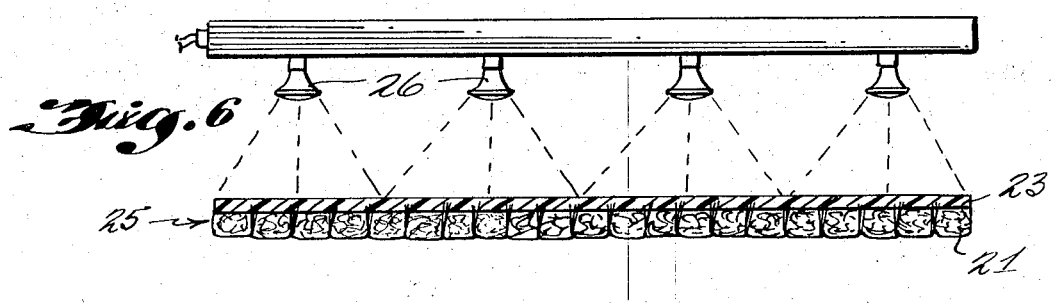
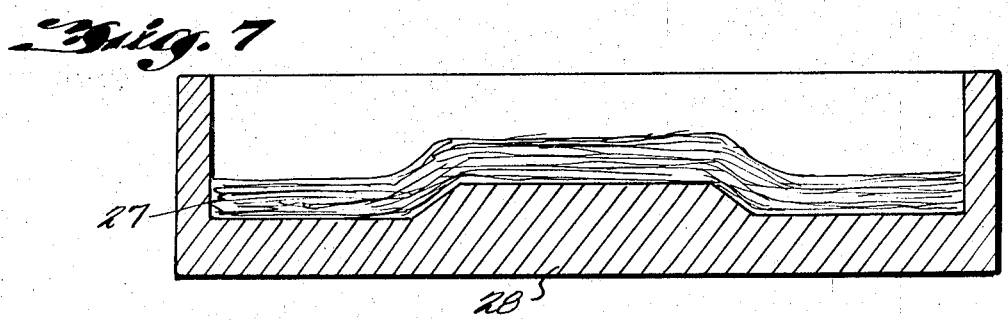
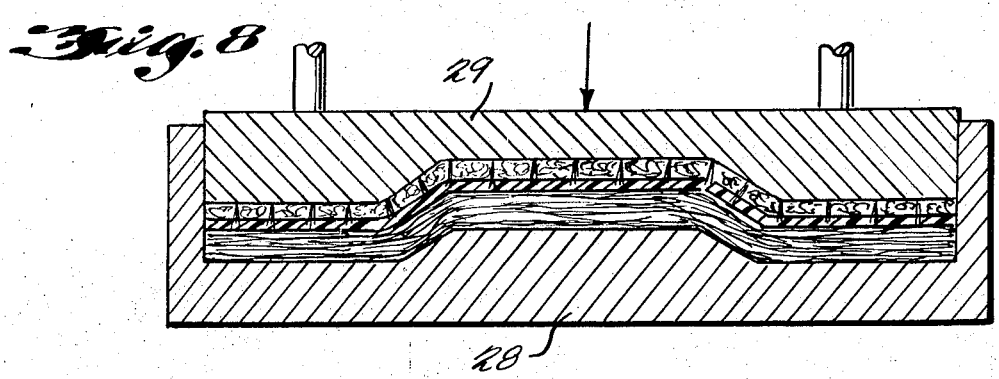
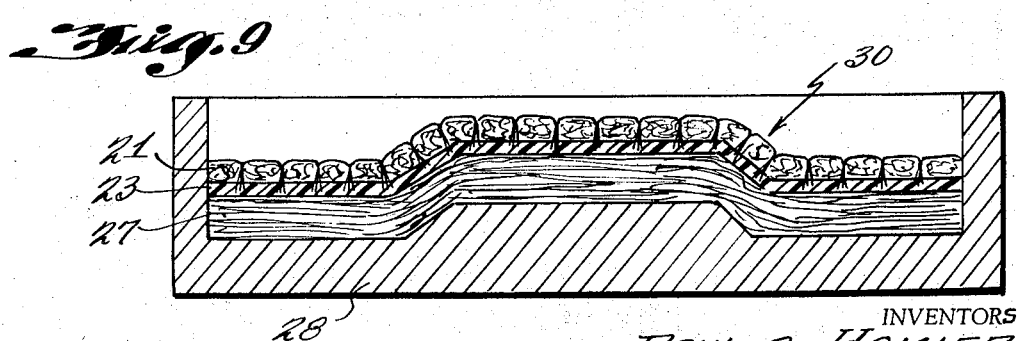
INVENTORS
PAUL A. HOMIER
RUPERT A. MCDANIEL, JR.
BY
Cushman, Darby & Cushman
ATTORNEYS

United States Patent Office 3,307,990
Patented Mar. 7, 1967

3,307,990
METHOD OF MAKING A COMPOSITE PRODUCT
Paul A. Homier, Langdale, and Rupert A. McDaniel, Jr., Fairfax, Ala., assignors to West Point-Pepperell, Inc., a corporation of Georgia
Filed Dec. 3, 1962, Ser. No. 241,941
6 Claims. (Cl. 156—72)

This invention relates to novel composite products, and in particular to shaped products having desirable fabric simulating surfaces. The products are useful, for example, as automotive floor coverings, and in preferred form comprise a relatively stiff sheet of organic thermoplastic material, having a non-woven fabric web integrally secured to one surface thereof and a relatively thick fibrous pad, of jute or the like, integrally secured to the other side thereof. The invention relates also to a method of making the composite product.

A principal object of the invention is to provide contoured composite structures adapted for use as floor coverings, snap-in automotive headliners, automotive trunk liners, luggage and the like. A specific object is to provide a novel floor covering for automotive use, premolded to desired shape, exhibiting rigidity and shape retention. The products of the invention are moldable, durable, attractive, sound deadening and heat insulating. Still another object is to provide an efficient method for producing composite, shape retentive fabric assemblies. Further objects will be in part evident and in part pointed out hereinafter.

Figure 1:
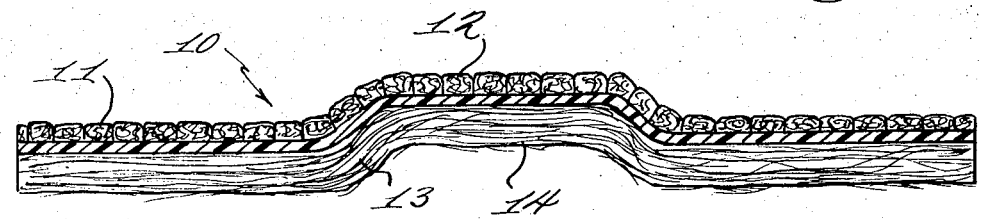

The invention will be clearly understood from the following description and the accompanying drawings, in which:

FIGURE 1 is a sectional view of an exemplary product in accordance with the invention, and FIGURES 2 through 9 are diagrammatic views illustrating preferred embodiments of the process of the invention, involving sequential steps in the manufacture of contoured automotive carpets.

In accordance with the preferred practice of the present invention, a non-woven fibrous web is needle punched into fusible polymeric film resulting in stabilization and bonding of the web, to produce a high strength non-woven fabric of attractive appearance. A relatively thick sheet of organic thermoplastic material, in softened state, is then applied to the back side of the non-woven fabric, and the assembly subjected to pressure before cooling of the thermoplastic material, so that the non-woven fabric is integrally secured to the surface of the thermoplastic sheet.

Subsequently, heat is applied to the exposed surface of the thermoplastic sheet to soften at least the surface layer thereof, and this surface is then placed in contact with a fibrous pad, and he assembly subjected to pressure in a mold, whereby the fibrous pad is integrally secured to the contacting surface of the thermoplastic sheet and the composite is formed to the shape of the mold. The composite product is then cooled in molded shape.

Referring to the drawings, FIGURE 1 shows a composite product 10 illustrative of the invention, comprising sheet 11 of organic thermoplastic material, non-woven fabric 12 integrally secured to one surface of the thermoplastic sheet and fiber pad 13 integrally secured to the other surface of the pastic sheet 11. As shown in FIGURE 1, the composite product is generally planar, except for the central hump 14. It will be understood that the thermoplastic sheet 11 is of such thickness as to exhibit considerable stiffness and impart shape to the composite product. While flexible, the composite product retains the predetermined shape imparted to it by the plastic sheet. As will be readily understood, the hump 14 may correspond to the shape of the transmission tunnel of an automobile, and the composite product 10 may be otherwise shaped to conform to the floor pan.

An exemplary process of manufacturing the product of FIGURE 1 in accordance with the present invention will now be described with reference to FIGURES 2 to 9. Initially, a suitably bonded non-woven fabric, which is to comprise the outer and visible surface layer of the composite product, is manufactured. While the non-woven fabric may be manufactured in accordance with a variety of conventional procedures, we prefer to cross-lay a card web on a cross lapper, to produce a relatively heavy fiber web ranging from about 14 to about 20 ounces per square yard. By way of example, the web may comprise from 70 to 75% rayon and from 25 to 30% nylon staple fibers, the fibers being 15 denier and 3 to 5 inches in length. By proper segregation of the nylon fibers in the hopper feed of the card, the nylon fibers may be concentrated in and near one edge of the card web, and thereby in cross-laying concentrated at and near one surface of the cross-laid web. The same result may be achieved by combining card webs of nylon fibers with card webs of rayon fibers, to obtain a thick web having nylon fibers concentrated at one surface thereof.

Figure 2:
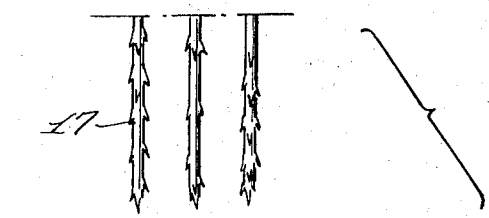

The web is then stabilized and bonded in the manner disclosed in copending application Serial No. 97,800, filed March 23, 1961, or as illustrated in FIGURE 2. As there shown, the unbonded non-woven web 15 of desired weight and fiber content and distribution is placed in surface contact with a relatively thin film 16 of organic thermoplastic material. The web 15 as continuously produced by the cross lapper may be fed onto the film, which is continuously led to the undersurface thereof from a supply roll. The film 16 is desirably composed of polyethylene having a melt index in the medium range, for example 1–10, and may be 3 to 4 mils in thickness. Such a film will soften and fuse at about 250° F. The web is fed onto the film with its predominantly nylon fiber side uppermost, and the assembled web and film are then led through a conventional needle loom, equipped with regular barb needles such as the needles 17. As shown, the assembly passes through the loom with the fiber web uppermost and facing the needles, whereby the film supports the web through the needle punching operation, the needles penetrating first the web and then the film. The speed of the web and film through the needle loom is desirable adjusted to achieve from about 280 to about 350 punches per square inch, and the needle penetration is desirably adjusted to penetrate ¾ to 1 inch through the film, whereby the first barb of each needle penetrates ½ to ¾ inch through the film and the next several barbs pass therethrough.

Figure 3:
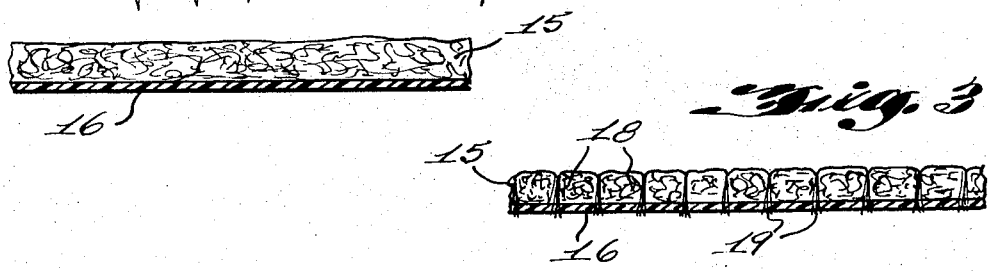

In the needle punching operation, fiber bundles are reoriented by the needles into direction normal to the web surfaces. Due primarily to the support of the underlying film, this is accomplished with only local disruption of the fiber web. The appearance of the needle punched assembly is illustrated in FIGURE 3, wherein the columnated fiber bundles 18 extend through the film 16 and terminate in fiber ends 19 protruding from the underside of the film. The fiber web is effectively stabilized by the film, and the assembly exhibits adequate strength for further processing.

The fibers constituting the non-woven fabric may be dyed before formation into a web. Alternatively, the film stabilized fabric may be dyed in a conventional manner, as on a continuous dye range or in a dye beck, the fabric having adequate stability for dyeing and subsequent drying. The dyed fabric may be dried at 250° F., and is sufficiently stable that dyeing and subsequent drying are accomplished without excessive shrinkage, e.g. more than about 3 or 4%. The fabric is adequately stabilized, moreover, that dyeing, drying, etc., do not materially disturb the fiber arrangement or appearance.

Figure 5:
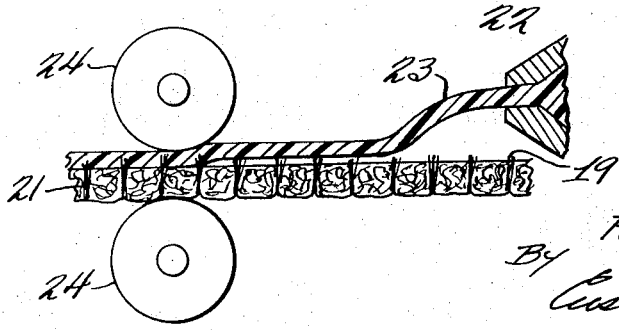

The next step in the process is to apply the film stabilized fiber web to a relatively thick sheet of organic thermoplastic material, in such manner that they are integrally joined together. This is conveniently accomplished as shown in FIGURE 5, wherein the fabric 21 with protruding fiber ends 19 uppermost is run below a conventional extruded 22, which extrudes a relatively thick sheet 23 of polyethylene onto the fabric 21. The extruded polyethylene may have the same melt index as the film 16 utilized to stabilize the fiber web. The fabric 21 and sheet 23 correspond in width, and the rate of extrusion of the sheet 23 is coordinated with the rate of travel of the fabric 21. Shortly after the extruded sheet 23 is laid on the fabric 21, the assembly passes between squeeze rolls 24 by means of which the assembly is subjected to moderate pressure, whereby the fabric and plastic sheet are integrally joined. As will be understood, the protruding fiber ends 19 are thereby embedded in the plastic sheet 23, which also adheres to the polyethylene present on the surface of the fabric. The polyethylene film on the surface of the fabric acts as a compatible film barrier, fuses with and prevents excessive penetration of the sheet 23 into the fabric 21, while providing for locking the needled fiber tips into the combined layers of polyethylene film and sheet. The intermediate product so formed is thereafter cooled, and the bonded fabric 21 is effectively and integrally secured to the plastic sheet 23, to the degree that delamination is impossible. By way of example, the plastic sheet 23 may be about 12 mils in thickness, weighting about 8 ounces per square yard.

The intermediate product resulting from the operation of FIGURE 5 is desirably cut to pieces of desired size, an illustrative section being shown in FIGURE 6 and indicated by the numeral 25. The next operation is to integrally join the exposed side of the plastic sheet 23 to a fiber pad, and this may be accomplished as illustrated in FIGURES 6 to 9. In FIGURE 6, the section 25 is disposed with plastic sheet 23 uppermost below a bank of infrared lamps 26, and the polyethylene surface so exposed is subjected to a temperature of 400 to 600° F. for a period of 30 to 60 seconds, whereby the polyethylene surface is heated to molten condition. Meanwhile a jute underlay pad 27 is positioned in a mold 28, as shown in FIGURE 7. The pad 27 may be, for example, ½ inch thick, weighing 30 to 70 ounces per square yard. A pad of suitable fiber arrangement may be readily formed on a garnet machine, and may if desired be lightly needled to improve the fiber interlock. Needling to the extent of only 50 punches per square inch is usally adequate to form a cohesive jute pad.

When the polyethylene surface of the section 25 is adequately heated, the section is turned over and placed in the mold 28 atop the pad 27, with the molten polyethylene surface in contact with the pad. A complementary mold 29 (FIGURE 8) then engages the outer, nonwoven surface of section 25, and applies moderate pressure thereto to form the composite product in the shape of the mold. The mold 29 may be pneumatically actuated, and its pressure not only forms the plastic sheet 23 in the shape of the mold, but also presses fibers of the jute pad 27 into the plastic sheet whereby they are integrally joined. Application of pressure for a period of from 50 to 90 seconds is usually adequate to effect the desired result. The mold 29 is then withdrawn, and the completed composite product may be permitted to cool in the mold 28, or may be removed therefrom and placed on a similarly shaped form to cool. The mold 28 may be in the shape of an automobile floor pan, and the composite product 30 when cooled will then have a corresponding shape, and will retain such shape through handling, shipment and the like, whereby it may be installed as an automotive carpet in a matter of seconds.

In the final product, the polyethylene sheet 23 remains in discrete sheet form, whereby it constitutes an inpenetrable barrier to liquids and vapor. As will be evident, other thermoplastic materials may be used in place of the polyethylene, for example rubber, synthetic rubber, polypropylene, acrylics and methacrylics. In place of the jute pad 27, thick non-woven fabrics of other fibers may be utilized. The central sheet 23 of thermoplastic material joining the non-woven fabric to the fibrous pad may be applied otherwise than by extrusion. For example, this layer may be applied to the back of the needled non-woven fabric in the form of a latex, dispersion, solution or dry powder, and the application may be made by means of a knife, roller, spray or the like. In any case, the film 16 provides a barrier to the flow of the material into the non-woven fabric, and the material applied serves to lock the fiber tips of the non-woven fabric which were needled through the film, and ultimately to adhere the fiber pad and serve as the primary shape imparting and maintaining layer of the composite product.

Figure 4:
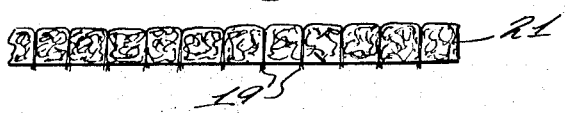

In accordance with a variation of the process described, the needle punched assembly of FIGURE 3 may be heated to fuse or partially fuse the film 16, as described in the copending application Serial No. 97,800, previously referred to. The needled assembly, for example, may be passed through an oven and heated briefly to a temperature of about 300° F. At this temperature, the film 16 softens and at least partially permeates the web, coating the fibers of the web, particularly at the fiber intersections. On subsequent cooling, the fiber web is effectively bonded by the polyethylene in the needle punched arrangement, whereby it exhibits high internal bond strength. The appearance of the bonded fabric 21 is shown in FIGURE 4. The film 16, in accordance with this procedure, loses its character as a discrete film, but enough of it remains on the surface to which the films was initially applied to function as an effective barrier. That is, when a polyethylene sheet is extruded onto the side from which the fiber ends 19 protrude, the polyethylene of the film 16 remaining on the web surface prevents excessive penetration of the extruded polyethylene sheet 23 into the web, when the assembly passes between the squeeze rolls 24.

The composite products described above, while essentially complete, may be otherwise and further treated for special purposes. For example, a latex backing may be applied to the outer side of the jute pad 27. If the product is intended for automotive use, rubber pads may be sewed or otherwise secured to the outer surface of the needled fabric 21, at strategic wear areas. For some purposes, edge binding may be applied.

It will thus be seen that there has been provided by this invention a method and product in which the various objects hereinbefore set forth, together with many practical advantages, are successfully achieved. As various possible embodiments may be made of the several features of the above invention, all without departing from the scope thereof, it is to be understood that all matter hereinbefore set forth or shown in the accompanying drawing, is to be interpreted as illustrative, and not in a limiting sense.

We claim:

1. Method of making a composite product comprising the steps of placing a non-woven fabric web in surface contact with a relatively thin thermoplastic film, needle punching the assembled web and film so that fiber ends protrude from said film, applying a relatively thick adhesive thermoplastic sheet to the film side of said non-woven fabric so that said protruded fiber ends are embedded therein, heating the opposite surface of said sheet to soften it, contacting said softened opposite surface with a fibrous pad, pressing the assembly in a mold to integrally join said sheet to said pad and impart shape to the assembly, and cooling the assembly in the shape imparted by the mold.

2. Method of making a composite product comprising the steps of placing a non-woven fabric web in surface contact with a relatively thin thermoplastic film, needle punching the assembled web and film so that fiber ends protrude from said film, dyeing and drying the non-woven fabric, applying a relatively thick adhesive thermoplastic sheet to the film side of said non-woven fabric so that said protruded fiber ends are embedded therein, heating the opposite surface of said sheet to soften it, contacting said softened opposite surface with a fibrous pad, pressing the assembly in a mold to integrally join said sheet to said pad and impart shape to the assembly and cooling the assembly in the shape imparted by the mold.

3. Method of making a composite product comprising the steps of placing a non-woven fabric web in surface contact wtih a relatively thin thermoplastic film, needle punching the assembled web and film, extruding a relatively thick molten thermoplastic sheet onto said non-woven fabric, integrally joining said sheet to said non-woven fabric by pressing them together before the sheet cools, heating the opposite surface of said sheet to soften it, contacting said softened opposite surface with a fibrous pad, pressing the assembly in a mold to integrally join said sheet to said pad and impart shape to the assembly, and cooling the assembly in the shape imparted by the mold.

4. Method of making a composite product comprising the steps of placing a non-woven fabric web in surface contact with a relatively thin thermoplastic film, needle punching the assembled web and film so that fiber ends protrude from said film, extruding a relatively thick molten thermoplastic sheet onto the film side of said non-woven fabric, integrally joining said sheet to said non-woven fabric by pressing them together before the sheet cools, heating the opposite surface of said sheet to soften it, contacting said softened opposite surface with a fibrous pad, pressing the assembly in a mold to integrally join said sheet to said pad and impart shape to the assembly, and cooling the assembly in the shape imparted by the mold.

5. Method of making a composite product comprising the steps of placing a non-woven fabric web in surface contact with a relatively thin thermoplastic film, needle punching the assembled web and film, heating the needle punched assembly to fuse the film material into the web and form a stabilized non-woven fabric, extruding a relatively thick molten thermoplastic sheet onto said non-woven fabric, integrally joining said sheet to said non-woven fabric by pressing them together before the sheet cools, heating the opposite surface of said sheet to soften it, contacting said softened opposite surface with a fibrous pad, pressing the assembly in a mold to integrally join said sheet to said pad and impart shape to the assembly, and cooling the assembly in the shape imparted by the mold.

6. Method of making a composite product comprising the steps of placing a non-women fabric web in surface contact with a relatively thin thermoplastic film, needle punching the assembled web and film, heating the needle punched assembly to fuse the film material into the web and form a stabilized non-woven fabric, dyeing and drying the stabilized non-woven fabric, extruding a relatively thick molten thermoplastic sheet onto the back side of said non-woven fabric, integrally joining said sheet to said non-woven fabric by pressing them together before the sheet cools, heating the opposite surface of said sheet to soften it, contacting said softened opposite surface with a needled jute pad, pressing the assembly in a mold to integrally join said sheet to said pad and impart shape to the assembly, and cooling the assembly in the shape imparted by the mold.

References Cited by the Examiner

UNITED STATES PATENTS

| | | | |
|---|---|---|---|
| 2,714,571 | 8/1955 | Irion et al. | |
| 2,913,803 | 11/1959 | Dodds | 161—88 X |
| 3,075,865 | 1/1963 | Cochran | 161—81 X |
| 3,211,600 | 10/1965 | Motycka | 156—214 |

ALEXANDER WYMAN, *Primary Examiner.*

EARL M. BERGERT, *Examiner.*

R. A. FLORES, L. PIRKEY, *Assistant Examiners.*